(12) United States Patent
Robinson et al.

(10) Patent No.: US 12,503,398 B2
(45) Date of Patent: Dec. 23, 2025

(54) BUILDING PRODUCT

(71) Applicant: ADAPTAVATE LIMITED, Wokingham (GB)

(72) Inventors: Thomas James Christopher Robinson, Ashbourne (GB); Jeffrey Ives, Bristol (GB)

(73) Assignee: ADAPTAVATE Limited, Bristol (GB)

( * ) Notice: Subject to any disclaimer, the term of this patent is extended or adjusted under 35 U.S.C. 154(b) by 712 days.

(21) Appl. No.: 17/794,474

(22) PCT Filed: Jan. 22, 2021

(86) PCT No.: PCT/GB2021/050139
§ 371 (c)(1),
(2) Date: Jul. 21, 2022

(87) PCT Pub. No.: WO2022/157466
PCT Pub. Date: Jul. 28, 2022

(65) Prior Publication Data
US 2024/0010563 A1 Jan. 11, 2024

(30) Foreign Application Priority Data
Jan. 23, 2020 (GB) .................................. 2000962.7

(51) Int. Cl.
| | |
|---|---|
| *C04B 28/12* | (2006.01) |
| *C04B 14/48* | (2006.01) |
| *C04B 18/24* | (2006.01) |
| *C04B 38/10* | (2006.01) |
| *C04B 103/30* | (2006.01) |
| *C04B 111/40* | (2006.01) |

(52) U.S. Cl.
CPC .............. *C04B 28/12* (2013.01); *C04B 14/48* (2013.01); *C04B 18/248* (2013.01); *C04B 38/10* (2013.01); *C04B 2103/30* (2013.01); *C04B 2111/40* (2013.01)

(58) Field of Classification Search
CPC ....... C04B 28/12; C04B 14/48; C04B 18/248; C04B 38/10; C04B 2103/30; C04B 2111/40; C04B 20/0088; C04B 28/10; C04B 2111/00181; C04B 18/28; C04B 18/021; C04B 2111/00267; C04B 28/04; C04B 12/04; C04B 14/06; C04B 18/24; C04B 22/064; C04B 22/066; C04B 24/38; C04B 24/383; C04B 2103/0079; C04B 2103/008; C04B 2103/302; Y02W 30/91; E04C 2/16

See application file for complete search history.

(56) References Cited

U.S. PATENT DOCUMENTS

2017/0001909 A1 1/2017 Ulrike et al.

FOREIGN PATENT DOCUMENTS

| | | |
|---|---|---|
| GB | 2591262 A | 7/2021 |
| NL | 1032103 C1 | 1/2018 |
| WO | WO2018/182419 A1 | 10/2018 |

OTHER PUBLICATIONS

Arnaud et al, "Experimental Study of Parameters Influencing Mechanical Properties of Hemp Concretes", Construction and Building Materials, vol. 28, Issue 1, Mar. 2021, 7 pgs.
P. Gle et al., "Acoustical Properties of Materials Made of Vegetable Particles with Several Scales of Porosity", Applied Acoustics, vol. 72, Issue 5, Apr. 2011, 11 pgs.
PCT Search Report and Written Opinion for PCT/GB2021/050139, mailing date Oct. 21, 2021, 10 pgs.
Chinese Office Action, mailed Aug. 30, 2025, for Chinese application No. 202180094580.3, with machine generated English translation, 36 pages.

*Primary Examiner* — Anthony J Green
(74) *Attorney, Agent, or Firm* — Lee & Hayes, P.C.

(57) ABSTRACT

The present invention relates to a bio-aggregate based building product comprising a macroporous element formed from a mixture of: a calcium carbonate derived binder and a lignocellulosic bio-aggregate. The macroporous element has an air and/or vapour and/or water open matrix with a microcapillary structure formed by the lignocellulosic bio-aggregate. The porosity of the macroporous element is at least 50% of the bulk volume of the building product. Between 40% and 80% by weight of bio-aggregate granulates forming the lignocellulosic bio-aggregate have a maximum particle size falling within the lower 50% of the particle size range. No more than 5% by weight of bio-aggregate granulates forming the lignocellulosic bio-aggregate have a maximum particle size falling within the upper 20% of the particle size range.

24 Claims, 1 Drawing Sheet

BUILDING PRODUCT

This application is a US national stage entry of international Patent Application No. PCT/GB2021/050139, filed Jan. 22, 2021, which claims priority to GB2000962.7, filed Jan. 23, 2020, the entire contents of each of which are incorporated by reference herein.

The present invention relates to a bio-aggregate based building product formed from a mixture of: a lignocellulosic bio-aggregate and a calcium carbonate derived binder, and to a method for producing the bio-aggregate based building product.

BACKGROUND TO INVENTION

Due to an increasing awareness of climate change, many governments have committed to meet the UN IPCC target of reaching a net zero carbon emission by 2050 in order to avoid a 1.5° C. increase in global warming.

In 2009, the construction sector was found to be responsible for producing 23% of the total global carbon emission. Emerging economies, such as China, were found to be responsible for producing the majority (estimated to be 60%) of this carbon emission (Huang et al 2018). According to a report by the World Bank in 2012, the global construction industry is responsible for over half of the planets solid waste. 1.3 billion tons of solid waste is predicted to be generated annually by 2021 and this is estimated to increase to 2.2 billion tons annually by 2025.

With a growing and rapidly urbanizing global population occurring at a time when governments are aiming to reduce net carbon emissions to zero in the next 30 years, the built environment is set to be a significant focus for decarbonization. Energy use in buildings, both residential and commercial is driven, in the majority, by the requirement to heat space. The key to ensuring that this predicted growth in the square meterage of buildings does not directly correlate with an increased energy use is to improve the energy efficiency of the buildings (International Energy Agency 2018).

Bio-based building materials present an opportunity for the construction sector to decarbonize the production, use and disposal of the materials widely used within the industry. To date, the use of bio-based materials within building materials as a replacement for conventional building materials has been limited due to their mechanical properties. Furthermore, bio-based materials naturally have greater variability than synthetic or inorganic materials and as such, the manufacture of bio-based composite materials on site or cast in-situ, can result in greater variability of the physical properties of these materials. Bio-based materials have greater natural variance as they are grown outside in uncontrolled environments and are subject to seasonal variations, with ever increasing unknown variation in a changing climate. Whilst there has been a small uptake in the use of biobased building materials within the construction industry, there has not been widespread adoption from the mainstream construction industry. Further uptake can be driven by reducing the performance variability of bio-based materials through mass manufacture within a controlled environment and smart manufacturing that takes into account variation. The conventional building materials are very well established with large capital infrastructure manufacturing facilities driving prices down. These well-established materials have also been globally standardized.

It is estimated that people spend 90% of their lives indoors. The humidity within an indoor environment often changes during the day and night. High humidity makes an environment feel colder through greater conductivity of heat away from the skin. As a result, the user may choose to increase the heating to raise the temperature of the indoor environment. A greater degree of thermal comfort can however be achieved in an environment that is not susceptible to excess relative humidity. Regulated relative humidity in a building can achieve a greater thermal comfort at lower temperatures and therefore a lower energy input is required. Furthermore, indoor environments are prone to condensation, which can provide favourable conditions for the germination of pathogenic bacteria or fungi which can cause respiratory diseases such as asthma.

There has also been increasing pressure on the gypsum industry. Gypsum production is linked to that of coal. Gypsum is mined and is found in seams that are adjacent to coal. Naturally mined gypsum has however been found to have decreasing levels of purity. Synthetic gypsum, which is prevalent in the production of gypsum plasterboard, is harvested from the flue gas of coal fired power stations. Many nations have targets to transition away from the use of coal fired power. As a result, sources of synthetic gypsum have started to decline. In addition to this the disposal of gypsum plasterboard is restricted and comes with an associated cost. When gypsum decays in the presence of organic matter it emits sulfur dioxide, which is a harmful and explosive gas. As such, gypsum plasterboard is a controlled waste stream and is contained in "mono-cell" landfill, for dry-lining installers this comes with an associated cost.

There is therefore a need for a bio-based building material, for example a non-gypsum bio-based material, with at least comparable mechanical properties, such as for example at least comparable flexural breaking strength, to mechanical properties of conventional building materials. There is a need for a cost-effective, environmentally friendly bio-based building material with reduced production costs and reduced disposal costs compared to conventional building materials. There is a need for a bio-based building material with less variability of physical properties. There is a need for a bio-based building material which is suitable for large scale manufacturing. There is a need for a bio-based building material which is capable of regulating humidity. There is a need for a bio-based building material, for example a bio-based board, that is an easy to install, breathable building material, such as for example internal lining material.

STATEMENT OF INVENTION

According to a first aspect of the present invention, there is provided a bio-aggregate based building product comprising a macroporous element formed from a mixture of: a calcium carbonate derived binder and a lignocellulosic bio-aggregate, in which the macroporous element has an air and/or vapor and/or water open matrix with a microcapillary structure formed by the lignocellulosic bio-aggregate, in which the porosity of the macroporous element is at least 50% of the bulk volume of the building product; and in which between 40% and 80% by weight of bio-aggregate granulates forming the lignocellulosic bio-aggregate have a maximum particle size falling within the lower 50% of the particle size range; and in which no more than 5% by weight of bio-aggregate granulates forming the lignocellulosic bio-aggregate have a maximum particle size falling within the upper 20% of the particle size range.

According to a second aspect of the present invention, there is provided a method of forming a building product as herein described comprising a macroporous element having an air and/or vapor and/or water open matrix with a microcapillary structure, comprising mixing lignocellulosic bio-aggregate with calcium carbonate derived binder, in which between 40% and 80% by weight of bio-aggregate granulates forming the lignocellulosic bio-aggregate have a maximum particle size falling within the lower 50% of the particle size range; and in which no more than 5% by weight of bio-aggregate granulates forming the lignocellulosic bio-aggregate have a maximum particle size falling within the upper 20% of the particle size range.

Once the mixture of the bio-aggregate and calcium carbonate derived binder has been produced, the mixture may be cured. The curing step may occur at any suitable temperature and over any suitable time period.

According to a third aspect of the present invention, there is provided a kit of parts for forming a building product comprising a macroporous element having an air and/or vapor and/or water open matrix with a microcapillary structure as herein described, the kit comprising:

- a lignocellulosic bio-aggregate, in which between 40% and 80% by weight of bio-aggregate granulates forming the lignocellulosic bio-aggregate have a maximum particle size falling within the lower 50% of the particle size range; and
- in which no more than 5% by weight of bio-aggregate granulates forming the lignocellulosic bio-aggregate have a maximum particle size falling within the upper 20% of the particle size range; and
- a calcium carbonate derived binder;
- optionally further comprising one or more of:
  - at least one rheological agent;
  - at least one water retention agent;
  - fiber reinforcement;
  - at least one flocculant agent;
  - at least one cementitious binder.

The present invention provides a bio-aggregate based building product which has high porosity, low density, high breathability, high water vapor permeability, high water vapor buffering ability, and good insulative properties. The bio-aggregate building product of the present invention has been found to be breathable (i.e. to let air, carrying water vapor, flow into and out of the building product) and to be capable of regulating humidity conditions within an environment. The bio-aggregate building product of the present invention has been found to have improved thermal and hygrothermal properties. The bio-aggregate building product of the present invention has been found to have improved acoustic properties. The bio-aggregate building product of the present invention has also been found to sequester volatile organic compounds.

The term "bio-aggregate" is used herein to refer to granulates formed from plant material. Each granulate within the bio-aggregate has a maximum particle size, which is used herein to refer to the largest dimension of the granulate. Each granulate retains the microcapillary structure present within the original plant material.

Lignocellulosic bio-aggregate is composed of cellulose, hemicellulose and lignin. The presence of the lignocellulosic bio-aggregate within the mixture has been found to enhance the hygroscopic nature of the resultant building product.

The calcium carbonate derived binder together with the lignocellulosic bio-aggregate form an air and/or vapor and/or water open matrix within the resultant bio-aggregate building product that provides the necessary structural integrity of the bio-aggregate building product whilst also providing a bio-aggregate building product which is suitable for mass manufacture.

Calcium carbonate is mined and then fired chemically releasing carbon dioxide and calcium oxide, which can be slaked to form calcium hydroxide or calcium hydrate. Impurities in the calcium oxide can increase the hydraulicity of binder and these are often referred to as naturally hydraulic limes although impurities in calcium carbonate can also lead to the formation of materials with other nomenclature. The term "calcium carbonate derived binders" is used herein to cover all of these binders.

The term "air and/or vapor and/or water open matrix" is used herein to refer to a matrix configured to enable the passage of air and/or water vapor and/or water into and out of, for example through, the matrix.

The lignocellulosic bio-aggregate is composed of xylem cells which are longitudinal and empty of content. The xylem cells of the lignocellulosic bio-aggregate are responsible for providing a strongly anisotropic, microcapillary structure of the bio-aggregate. Hydroxyl bridges and/or hydrogen bonding may form between the calcium carbonate derived binder and the lignocellulosic bio-aggregate particles to provide adhesion between the binder and the bio-aggregate within the mixture. Once cured, the lignocellulosic bio-aggregate and calcium carbonate derived binder together form a bio-based building product comprising a macroporous element having an air and/or vapor and/or water open matrix with a microcapillary structure.

The macroporous element of the product comprises a plurality of voids. The porosity of the macroporous element is defined by the void fraction of the macroporous element. The porosity of the macroporous element of the building product, as a percentage of the bulk volume of the building product, is preferably at least 50%, preferably at least 60%, preferably at least 70%, for example at least 80%.

The voids within the macroporous element may be closed, or open and connected to other voids and/or the external surface(s) of the building product by the microcapillary structure formed by the lignocellulosic bio-aggregate enabling air and/or water vapor and/or water to be absorbed and desorbed by the product through the microcapillary structure by capillary flow. The microcapillaries within the microcapillary structure of the bio-aggregate have a different rate of capillary suction to the macroporous element. As such the microcapillaries within the matrix enable the building product to absorb water vapor and/or water and/or air at different rates to the macroporous element (or voids) thereby providing the building product with increased breathability, increased porosity and/or increased capacity for water vapor and/or water absorption.

In use, in high humidity water vapor passes through the microcapillaries provided within the macroporous element of the product and can be collected within pores within the macroporous element. In conditions of lower humidity, water vapor stored within the pores of the macroporous element can be released from the product back into the environment. As such, the building product of the present invention is able to regulate internal relative humidity by buffering water vapor through continual cycles of absorbing and desorbing water vapor from and into the environment.

The macroporous element, comprising voids and a microcapillary structure, is able to allow air to flow into and out of the open matrix providing the breathable nature of the building product. The breathable nature of the building product of the present invention ensures that the risk of mould and condensation within an environment associated with the building product is significantly reduced. Consequently, the building product of the present invention helps to reduce the risk of respiratory disease, creating a healthy environment for the building's users.

The bio-aggregate based building product of the present invention is preferably composed of natural materials. Preferably, the bio-aggregate based building product is composed of at least 80% wt, preferably at least 90% wt, preferably at least 95% wt, for example about 99% wt of natural materials compared to the total weight of the mixture. In one embodiment, the bio-aggregate based building product consists entirely of natural materials.

In one embodiment, the bio-aggregate based building product is biodegradable, preferably at least 10% wt, preferably at least 20% wt, preferably at least 30% wt, of the materials based on the total weight of the mixture forming the product are biodegradable. Preferably, no more than 90% wt, preferably no more than 80% wt, preferably no more than 70% wt of the materials based on the total weight of the mixture forming the product are biodegradable. Preferably, between 10% wt and 90% wt, preferably between 20% wt and 80% wt, preferably between 30% wt and 70% wt, for example between 45% wt and 65% wt, of the materials based on the total weight of the mixture forming the product are biodegradable. In one embodiment, the bio-aggregate based building product consists entirely of biodegradable materials. The bio-aggregate based building product may therefore biodegrade and break down into natural materials within the environment without producing any harmful byproducts or toxins. The bio-aggregate based building product may break down to from the organic horizon of soil and as such the bio-aggregate based building product provides agronomic benefits compared to conventional building products.

In one embodiment, the bio-aggregate based building product may be substantially free of gypsum. The term "substantially free" is used herein to refer to the product comprising no more than 1% wt, preferably no more than 0.5%, preferably no more than 0.2%, preferably no more than 0.1% wt, preferably 0% wt of gypsum based on the total weight of the mixture. In one embodiment, the present invention provides a non-gypsum containing bio-aggregate based building product with comparable structural properties to conventional building products. The present invention provides non-gypsum containing building products which do not suffer from the problems associated with the use of gypsum, such as for example the problems associated with decreasing supply sources of gypsum, the decreasing purity of natural mined gypsum, the increased costs associated with extraction and calcination, the reduction in sources of synthetic gypsum, and the problems associated with disposal of gypsum which is treated as a controlled waste.

The lignocellulosic bio-aggregate of the product of the present invention is preferably annually renewable and therefore reduces the requirement for finite material, such as for example gypsum resources.

The lignocellulosic bio-aggregate may be provided by a broad range of plant types and as such the building product may be prepared from low value, readily (and preferably locally) available, highly voluminous plant material. Furthermore, the building product of the present invention may be produced on a large scale at low cost with low associated energy costs.

Suitable plant material for use as the lignocellulosic bio-aggregate may include for example perennial plant(s), such as for example processed perennial plant(s), and/or byproducts of processing of perennials plant(s), having a suitable lignocellulosic profile. For example, where perennial plants are processed that are deemed suitable these processed perennial plants may be incorporated as lignocellulosic bio-aggregate for agronomical advantage. Where by-products from the processing of perennials have the correct lignocellulosic profile, these by-products may be incorporated as the lignocellulosic bio-aggregate. Suitable plant material for use as the bio-aggregate includes both softwood and hardwood timber particles having an appropriate particle size and suitable cell structure.

Examples of plant species having a suitable cell capillary architecture for use as a bio-aggregate include, but are not limited to, woody lignin-based plants In one embodiment, the bio-aggregate comprises one or more of: Common wheat (*Triticum aestivum*), Hemp (*Cannabis sative*), Oats (*Avena sativa*), Rapeseed (*Brassica napus*), barley (*Hordeum vulgare*), Giant miscanthus (*Miscanthus giganteus*), Bamboo, Flax, Rice straw, Corn straw, Sugarcane bagasse, Sisal straw, or any combination thereof.

The bio-aggregate may be formed from any suitable part of the plant. Preferably, the bio-aggregate is formed from the stem of a plant. The plant, or parts of a plant, may be mechanically processed to remove non-lignocellulosic parts of the plant material prior to forming the bio-aggregate.

The bio-aggregate based building product preferably comprises a milled lignocellulosic bio-aggregate. The milled lignocellulosic bio-aggregate preferably retains the microcapillary structure of the lignocellulosic bio-aggregate. The milled lignocellulosic bio-aggregate is preferably in the form of a straw-like lignocellulosic material, such as for example finely granulated straw-like lignocellulosic material. The lignocellulosic bio-aggregate may be milled using any conventional milling mechanism, such as for example a knife, hammer, rotary or ball mill. The milled lignocellulosic bio-aggregate may be passed through a screen or sieve having predetermined pores to enable milled lignocellulosic bio-aggregate having predetermined dimensions to pass therethrough.

The bio-aggregate is preferably formed from chemically unprocessed lignocellulosic plant material. The term "chemically unprocessed" is used herein to refer to plant material in which the cell capillary architecture within the plant material remains unchanged.

The bio-aggregate may be formed from any suitable plant species having a suitable cell capillary architecture, for example an open tubular cell capillary structure, and a suitable ratio of lignin to cellulose within the plant material. Preferably the ratio of lignin to cellulose within the bio-aggregate is no more than 3:1, preferably no more than 2.5:1, preferably no more than 2:1, for example about 1.6:1. Preferably the ratio of lignin to cellulose within the bio-aggregate is at least 0.3:1, preferably at least 0.4:1, preferably at least 0.5:1, for example about 0.6:1. Preferably the ratio of lignin to cellulose within the bio-aggregate is in the range of between 0.3:1 to 3:1, preferably in the range of between 0.4:1 to 2.5:1, preferably in the range of between 0.5:1 to 2:1, preferably in the range of between 0.6:1 to 1.6:1.

The structure of the macroporous element of the matrix has been found to have good resistance to continuous cycling of water vapor without degradation. As such, the building product of the present invention can continuously absorb and desorb water/water vapor without signs of degradation. The building product of the present invention therefore has an extended life span. The cell capillary structure and chemical make up of the lignocellulosic bio-aggregate has been found to be responsible for this material attribute of the building product. The microfibrils within the plant material are highly cellulosic and are responsible for the transportation of water. The microfibrils are surrounded by hydrophilic compounds, such as lignin and hemicellulose, in order to protect the microfibrils from degradation. Lignin has been found to be more resistance to degradation on contact with water than cellulose. As such, the lignocellulosic bio-aggregate within the building product helps to ensure that the product has good resistance to continuous cycling of water vapor without degradation.

The maximum bio-aggregate particle size of the granulates within the bio-aggregate is selected to ensure that the product comprises an open matrix configured to be able to absorb/desorb air and/or water and/or water vapor as discussed herein, and to also ensure that the building product can be produced, for example on a large scale, using industrial processing.

In particular, the maximum bio-aggregate particle size of, and in particular the range of maximum bio-aggregate particle sizes within, the bio-aggregate may be selected to provide a mixture of calcium carbonate derived binder and bio-aggregate having suitable wet flow dynamics, viscosity, rheology and cohesion applicable for industrial processing, such as for example by extrusion, for example continuous extrusion, or by deposition, for example 3D printing.

The maximum particle size of granulates within the bio-aggregate preferably is no greater than about 100 mm, more preferably no greater than about 70 mm, more preferably no greater than about 50 mm, more preferably no greater than 40 mm, for example no greater than 30 mm.

The maximum particle size of the granulates of the bio-aggregate preferably is at least about 0.1 mm, more preferably at least about 0.15 mm, more preferably at least about 0.2 mm, for example at least about 0.25 mm.

The range of maximum particle sizes of the granulates of the bio-aggregate is preferably within the range of between 0.1 mm and 100 mm, preferably in the range of between 0.1 mm and 70 mm, preferably in the range of between 0.1 mm and 50 mm.

The profile of the distribution of maximum particle sizes of the granulates of the bio-aggregate is of importance to both the manufacturing and structural performance of the resultant product.

Particle size distribution is conventionally defined by the method by which it is determined. One suitable method is sieve analysis, where powder is separated on sieves of different sizes. The particle size distribution is therefore determined in terms of discrete size ranges based on the sizes of sieves used. The particle size distribution may be presented in cumulative form.

In one embodiment, the bio-aggregate comprises a pre-determined particle size distribution ranging from a minimum value of a maximum particle size to a maximum value of a maximum particle size.

In one embodiment, the cumulative particle size distribution function of the bio-aggregate, when determined from the highest value of maximum particle size to the lowest value of maximum particle size, is substantially S-shaped.

In one embodiment, at least 0.1% by weight, preferably at least 0.5% by weight of bio-aggregate granulates forming the bio-aggregate have a maximum particle size falling within the upper 10%, preferably within the upper 20%, preferably within the upper 30%, preferably within the upper 40%, of the particle size range (as measured from the lowest value of maximum particle size to the highest value of maximum particle size of the granulates within the bio-aggregate).

In one embodiment, no more than 5% by weight, preferably no more than 2% by weight, for example about 1% by weight of bio-aggregate granulates forming the bio-aggregate have a maximum particle size falling within the upper 10%, preferably within the upper 20%, preferably within the upper 30%, preferably within the upper 40%, preferably within the upper 50%, of the particle size range (as measured from the lowest value of maximum particle size to the highest value of maximum particle size of the granulates within the bio-aggregate).

In one embodiment, between 0.1% and 5% by weight, preferably between 0.1% and 2% by weight, preferably between 0.1% and 1% by weight, for example between 0.5% and 1% by weight, of bio-aggregate granulates forming the bio-aggregate have a maximum particle size falling within the upper 10%, preferably within the upper 20%, preferably within the upper 30%, preferably within the upper 40%, of the particle size range (as measured from the lowest value of maximum particle size to the highest value of maximum particle size of the granulates within the bio-aggregate).

In one embodiment, substantially 0% by weight, preferably at least 0.1% by weight, preferably at least 0.2% by weight of bio-aggregate granulates forming the bio-aggregate have a maximum particle size falling within the range of between the upper 20% and the upper 30%, preferably between the upper 20% and the upper 40%, of the particle size range (as measured from the lowest value of maximum particle size to the highest value of maximum particle size of the granulates within the bio-aggregate).

In one embodiment, no more than 2% by weight, preferably no more than 1% by weight, preferably no more than 0.5% by weight of bio-aggregate granulates forming the bio-aggregate have a maximum particle size falling within the range of between the upper 20% and the upper 30%, preferably between the upper 20% and the upper 40%, of the particle size range (as measured from the lowest value of maximum particle size to the highest value of maximum particle size of the granulates within the bio-aggregate).

In one embodiment, between 0% and 2% by weight, preferably between 0% and 1% by weight, between 0.1% by weight and 2% by weight, preferably between 0.1% and 1% by weight, preferably between 0.1% and 0.5% by weight of bio-aggregate granulates forming the bio-aggregate have a maximum particle size falling within the range of between the upper 20% and the upper 30%, preferably between the upper 20% and the upper 40%, of the particle size range (as measured from the lowest value of maximum particle size to the highest value of maximum particle size of the granulates within the bio-aggregate).

In one embodiment, at least 10% by weight, preferably at least 15% by weight, preferably at least 20% by weight of bio-aggregate granulates forming the bio-aggregate have a maximum particle size falling within the upper 50% of the particle size range (as measured from the lowest value of maximum particle size to the highest value of maximum particle size of the granulates within the bio-aggregate).

In one embodiment, no more than 50% by weight, preferably no more than 40% by weight, preferably no more than 30% by weight, of bio-aggregate granulates forming the bio-aggregate have a maximum particle size falling within the upper 50% of the particle size range (as measured from the lowest value of maximum particle size to the highest value of maximum particle size of the granulates within the bio-aggregate).

In one embodiment, between 10% and 50% by weight, preferably between 10% and 40% by weight, preferably between 10% and 30% by weight, preferably between 15% and 50% by weight, preferably between 15% and 40% by weight, preferably between 15% and 30% by weight, preferably between 20% and 50% by weight, preferably 20% and 40% by weight, preferably between 20% and 30% by weight, of bio-aggregate granulates forming the bio-aggregate have a maximum particle size falling within the upper 50% of the particle size range (as measured from the lowest value of maximum particle size to the highest value of maximum particle size of the granulates within the bio-aggregate).

In one embodiment, at least 0.1% by weight, preferably at least 0.5% by weight of bio-aggregate granulates forming the bio-aggregate have a maximum particle size falling within the lower 5% of the particle size range (as measured from the lowest value of maximum particle size to the highest value of maximum particle size of the granulates within the bio-aggregate).

In one embodiment, no more than 5% by weight, preferably no more than 2% by weight, for example no more than about 1% by weight of bio-aggregate granulates forming the bio-aggregate have a maximum particle size falling within the lower 5% of the particle size range (as measured from the lowest value of maximum particle size to the highest value of maximum particle size of the granulates within the bio-aggregate).

In one embodiment, between 0.1% by weight and 5% by weight, preferably between 0.1% and 2% by weight, preferably between 0.1% and 1% by weight, for example between 0.5% and 1% by weight of bio-aggregate granulates forming the bio-aggregate have a maximum particle size falling within the lower 5% of the particle size range (as measured from the lowest value of maximum particle size to the highest value of maximum particle size of the granulates within the bio-aggregate).

In one embodiment, at least 1% by weight, preferably at least 2% by weight, preferably at least 3% by weight of bio-aggregate granulates forming the bio-aggregate have a maximum particle size falling within the lower 10% of the particle size range (as measured from the lowest value of maximum particle size to the highest value of maximum particle size of the granulates within the bio-aggregate).

In one embodiment, no more than 15% by weight, preferably no more than 12% by weight, for example no more than about 10% by weight of bio-aggregate granulates forming the bio-aggregate have a maximum particle size falling within the lower 10% of the particle size range (as measured from the lowest value of maximum particle size to the highest value of maximum particle size of the granulates within the bio-aggregate).

In one embodiment, between 1% by weight and 15% by weight, preferably between 1% and 10% by weight, preferably between 2% and 10% by weight, for example between 5% and 10% by weight of bio-aggregate granulates forming the bio-aggregate have a maximum particle size falling within the lower 10% of the particle size range (as measured from the lowest value of maximum particle size to the highest value of maximum particle size of the granulates within the bio-aggregate).

In one embodiment, at least 2% by weight, preferably at least 5%, by weight of bio-aggregate granulates forming the bio-aggregate have a maximum particle size falling within the lower 20% of the particle size range (as measured from the lowest value of maximum particle size to the highest value of maximum particle size of the granulates within the bio-aggregate).

In one embodiment, no more than 20% by weight, preferably no more than 15% by weight, no than 10% by weight of bio-aggregate granulates forming the bio-aggregate have a maximum particle size falling within the lower 20% of the particle size range (as measured from the lowest value of maximum particle size to the highest value of maximum particle size of the granulates within the bio-aggregate).

In one embodiment, between 2% and 20% by weight, preferably between 2% and 15% by weight, preferably between 5% and 20% by weight, preferably between 5% and 15% by weight, preferably between 5% and 10% by weight, of bio-aggregate granulates forming the bio-aggregate have a maximum particle size falling within the lower 20% of the particle size range (as measured from the lowest value of maximum particle size to the highest value of maximum particle size of the granulates within the bio-aggregate).

In one embodiment, preferably at least 5% by weight, preferably at least 10% by weight of bio-aggregate granulates forming the bio-aggregate have a maximum particle size falling within the range of between the lower 5% and the lower 20%, preferably between the lower 10% and the lower 20%, of the particle size range (as measured from the lowest value of maximum particle size to the highest value of maximum particle size of the granulates within the bio-aggregate).

In one embodiment, no more than 30% by weight, preferably no more than 25% by weight, of bio-aggregate granulates forming the bio-aggregate have a maximum particle size falling within the range of between the lower 5% and the lower 20%, preferably between the lower 10% and the lower 20%, of the particle size range (as measured from the lowest value of maximum particle size to the highest value of maximum particle size of the granulates within the bio-aggregate).

In one embodiment, between 5% and 30% by weight, preferably between 5% and 25% by weight, preferably between 10% and 30% by weight, preferably between 10% and 25% by weight, of bio-aggregate granulates forming the bio-aggregate have a maximum particle size falling within the range of between the lower 5% and the lower 20%, preferably between the lower 10% and the lower 20%, of the particle size range (as measured from the lowest value of maximum particle size to the highest value of maximum particle size of the granulates within the bio-aggregate).

In one embodiment, at least 10% by weight, preferably at least 15% by weight, preferably at least 20% by weight, of bio-aggregate granulates forming the bio-aggregate have a maximum particle size falling within the lower 30% of the particle size range (as measured from the lowest value of maximum particle size to the highest value of maximum particle size of the granulates within the bio-aggregate).

In one embodiment, no more than 40% by weight, preferably no more than 30% by weight, preferably no more than 25% by weight, of bio-aggregate granulates forming the bio-aggregate have a maximum particle size falling within the lower 30% of the particle size range (as measured from the lowest value of maximum particle size to the highest value of maximum particle size of the granulates within the bio-aggregate).

In one embodiment, between 10% and 40% by weight, preferably between 10% and 30% by weight, preferably between 10% and 25% by weight, preferably between 15% and 40% by weight, preferably between 15% and 30% by weight, preferably between 15% and 25% by weight, preferably between 20% and 25% by weight, of bio-aggregate granulates forming the bio-aggregate have a maximum particle size falling within the lower 30% of the particle size range (as measured from the lowest value of maximum particle size to the highest value of maximum particle size of the granulates within the bio-aggregate).

In one embodiment, at least 5% by weight, preferably at least 8% by weight, preferably at least 10% by weight of bio-aggregate granulates forming the bio-aggregate have a maximum particle size falling within the range of between the lower 20% and the lower 30% of the particle size range (as measured from the lowest value of maximum particle size to the highest value of maximum particle size of the granulates within the bio-aggregate).

In one embodiment, no more than 20% by weight, preferably no more than 15% by weight, for example about 13% by weight of bio-aggregate granulates forming the bio-aggregate have a maximum particle size falling within the range of between the lower 20% and the lower 30% of the particle size range (as measured from the lowest value of maximum particle size to the highest value of maximum particle size of the granulates within the bio-aggregate).

In one embodiment, between 5% and 20% by weight, preferably between 5% and 15%, preferably between 10% and 15% by weight of bio-aggregate granulates forming the bio-aggregate have a maximum particle size falling within the range of between the lower 20% and the lower 30% of the particle size range (as measured from the lowest value of maximum particle size to the highest value of maximum particle size of the granulates within the bio-aggregate).

In one embodiment, at least 20% by weight, preferably at least 30% by weight, preferably at least 40% by weight of bio-aggregate granulates forming the bio-aggregate have a maximum particle size falling within the lower 40% of the particle size range (as measured from the lowest value of maximum particle size to the highest value of maximum particle size of the granulates within the bio-aggregate).

In one embodiment, no more than 70% by weight, preferably no more than 60% by weight, preferably no more than 55% by weight, preferably no more than 50% by weight of bio-aggregate granulates forming the bio-aggregate have a maximum particle size falling within the lower 40% of the particle size range (as measured from the lowest value of maximum particle size to the highest value of maximum particle size of the granulates within the bio-aggregate).

In one embodiment, between 20% and 70% by weight, preferably between 30% and 70% by weight, preferably between 30% and 60% by weight, preferably between 40% and 60% by weight, preferably between 30% and 50% by weight, preferably between 40% and 50% by weight of bio-aggregate granulates forming the bio-aggregate have a maximum particle size falling within the lower 40% of the particle size range (as measured from the lowest value of maximum particle size to the highest value of maximum particle size of the granulates within the bio-aggregate).

In one embodiment, at least 10% by weight, preferably at least 15% by weight, preferably at least 20% by weight of bio-aggregate granulates forming the bio-aggregate have a maximum particle size falling within the range of between the lower 30% and the lower 40% of the particle size range (as measured from the lowest value of maximum particle size to the highest value of maximum particle size of the granulates within the bio-aggregate).

In one embodiment, no more than 40% by weight, preferably no more than 30% by weight of bio-aggregate granulates forming the bio-aggregate have a maximum particle size falling within the range of between the lower 30% and the lower 40% of the particle size range (as measured from the lowest value of maximum particle size to the highest value of maximum particle size of the granulates within the bio-aggregate).

In one embodiment, between 10% and 40% by weight, preferably between 10% and 30% by weight, preferably between 15% and 40% by weight, preferably between 15% and 30% by weight, preferably between 20% and 40% by weight, preferably between 20% and 30% by weight of bio-aggregate granulates forming the bio-aggregate have a maximum particle size falling within the range of between the lower 30% and the lower 40% of the particle size range (as measured from the lowest value of maximum particle size to the highest value of maximum particle size of the granulates within the bio-aggregate).

In one embodiment, at least 40% by weight, preferably at least 50% by weight, preferably at least 60% by weight of bio-aggregate granulates forming the bio-aggregate have a maximum particle size falling within the lower 50% of the particle size range (as measured from the lowest value of maximum particle size to the highest value of maximum particle size of the granulates within the bio-aggregate).

In one embodiment, no more than 80% by weight, preferably no more than 70% by weight, of bio-aggregate granulates forming the bio-aggregate have a maximum particle size falling within the lower 50% of the particle size range (as measured from the lowest value of maximum particle size to the highest value of maximum particle size of the granulates within the bio-aggregate).

In one embodiment, between 40% and 80% by weight, preferably between 50% and 80% by weight, preferably between 60% and 80% by weight, preferably between 40% and 70% by weight, preferably between 50% and 70% by weight, preferably between 60% and 70% by weight of bio-aggregate granulates forming the bio-aggregate have a maximum particle size falling within the lower 50% of the particle size range (as measured from the lowest value of maximum particle size to the highest value of maximum particle size of the granulates within the bio-aggregate).

In one embodiment, at least 5% by weight, preferably at least 10% by weight, preferably at least 15% by weight, of bio-aggregate granulates forming the bio-aggregate have a maximum particle size falling within the range of between the lower 40% and the lower 50% of the particle size range (as measured from the lowest value of maximum particle size to the highest value of maximum particle size of the granulates within the bio-aggregate).

In one embodiment, no more than 30% by weight, preferably no more than 20% by weight, of bio-aggregate granulates forming the bio-aggregate have a maximum particle size falling within the range of between the lower 40% and the lower 50% of the particle size range (as measured from the lowest value of maximum particle size to the highest value of maximum particle size of the granulates within the bio-aggregate).

In one embodiment, between 5% and 30% by weight, preferably between 5% and 20% by weight, preferably between 10% and 20% by weight, of bio-aggregate granulates forming the bio-aggregate have a maximum particle size falling within the range of between the lower 40% and the lower 50% of the particle size range (as measured from the lowest value of maximum particle size to the highest value of maximum particle size of the granulates within the bio-aggregate).

For building products having a greater thickness, a greater proportion of the flexural rigidity can be attained from the form of the product. As such, this allows products having a greater dimension, such as thickness, to be formed from a bio-aggregate having a larger maximum particle size than would be suitable for building products having a smaller dimension, such as thickness. The distribution of maximum particle sizes and the relationship between different particle size fractions of granulates within the bio-aggregate is scalable with the thickness of the product and therefore particle size.

It is to be understood that the maximum particle size of the granulates within the bio-aggregate may be dependent on the dimensions of the resultant building product. For example, the maximum particle size of granulates within the bio-aggregate may be no more than 0.5 times, preferably no more than 0.4 times, preferably no more than 0.3 times a dimension of a building product, for example the thickness of the building product. For example, a building product, such as for example an insulation panel, could have a thickness of up to 200 mm and the maximum particle size of the bio-aggregate present within the building product may be 70 mm.

It is to be understood that in scaling up of the maximum particle size of granulates within the bio-aggregate that the distribution of smaller granulates within the bio-aggregate would follow. The range of maximum particle sizes of granulates within the bio-aggregate allows for the bio-aggregate, and mixture of bio-aggregate and binder, to flow well during industrial manufacture and provides a very cohesive mixture material that provides a material architecture that allows for structural efficiency.

Furthermore, it has also been found that the product of the present invention has improved thermal resistance compared to conventional building products. The bio-aggregate based building product of the present invention is configured to store air within the voids and the microcapillaries of the open matrix of the macroporous element. As such, these air filled (or partially filled) voids and/or microcapillaries reduce the thermal conductivity of the product providing improved thermal resistance compared to conventional building products. It has also been found that thermal and hygrothermal properties of the building product can be optimised by using bio-aggregates comprising granulates with larger maximum particle sizes. The maximum particle size of granulates within the bio-aggregates forming the building product may be selected in order to optimise the thermal and hygrothermal properties of the resultant building product.

It has also been found that the product of the present invention also has improved acoustic performance compared to conventional building products. The air pores or voids within the or surrounding the microcapillaries of the open matrix of the macroporous element provide multiple changes in density for sound waves passing through the structure of the product. These changes in density within the building product help to diffuse sound, and reduce the reflection of sound, thereby increasing its impedance, particularly at lower and higher frequencies. The product of the present invention has improved sound dampening qualities compared to conventional building products.

As water and/or water vapor and/or air passes into and out of the microcapillary structure of the macroporous element of the product of the present invention, it has been found that volatile organic compounds are also absorbed into the open matrix, for example into the voids and/or microcapillary structure of the open matrix of the product. It has been found that the microcapillary structure of the product sequesters the volatile organic compounds and absorbs a greater amount of volatile organic compounds than are desorbed back into the environment. The present invention therefore provides a bio-aggregate based building product with an improved ability to regulate air quality and/or clean air within an environment compared to conventional building products.

The lignocellulosic bio-aggregate may further comprise one or more additional organic and/or inorganic components, such as for example pectin, waxes, fats, water-soluble components and ash, and any combination thereof.

The calcium carbonate derived binder is preferably present in the form of a vapor open mineral blend. The calcium carbonate derived binder may be in the form of calcium hydroxide (hydrated lime), the an-hydrate of calcium oxide. Preferably, the calcium carbonate derived binder is formed from CL-90 hydrated lime. The calcium carbonate derived binder may be formed from calcium oxide (quicklime). The calcium carbonate derived binder may be formed from calcium hydroxide and calcium oxide. The calcium carbonate derived binder may be formed from one or more of: calcium hydroxide and/or calcium oxide, in combination with one or more of: lime putty and/or milk of lime. The calcium carbonate derived binder may be in the form of naturally hydraulic limes.

The calcium carbonate derived binder may be present in the form of a slurry or suspension. The rheology of the slurry or suspension may be relatively low due to a narrow particle size distribution. The rheology of the calcium carbonate derived binder, in the form of a slurry or suspension, may be improved by the addition of one or more rheology modifier(s) to the calcium carbonate derived binder. The one or more rheology modifier may be selected from one or more of: sodium water glass (sodium silicate), calcareous groats (by-product of the lime slaking process), and/or magnesium lime (for example comprising at least 5% by weight of magnesium oxide and/or between 5% and 35% by weight of magnesium carbonate). The at least one rheology modifier may be present within the calcium carbonate derived binder in an amount of at least 1% by weight. The at least one rheology modifier may be present within the calcium carbonate derived binder in an amount of no more than 20% by weight. The at least one rheology modifier may be present within the calcium carbonate derived binder in an amount of between 1% and 20% by weight.

The rheology of the calcium carbonate derived binder may be improved by the addition of at least one rheological agent. The at least one rheological agent may comprise one or more naturally occurring saccharide or carbohydrate. The naturally occurring saccharide may be selected from one or more: monosaccharide, disaccharide, common sugars (such as fructose, sucrose or glucose), or any combination thereof. The naturally occurring carbohydrate is preferably one or more of: cellulose, starch, hemi cellulose, chitin, chitinouse, glycogen, or any combination thereof.

In one embodiment, the method for producing the building product may further comprise priming surfaces configured to be contacted with the mixture of calcium carbonate derived binder and the bio-aggregate with one or more of: milk of lime which is a suspension of calcium hydroxide in water. The surfaces may be primed prior to or during manufacture of the building product, for example prior to or during deposition or extrusion. Such surfaces would include but not be limited to one or more surfaces of: lining paper of varying densities, structural elements inclusive of hollow section extrusions or timber elements, co-extruded boards of organic or in-organic binder matrices. In one embodiment, the calcium carbonate derived binder may be provided as a slurry or suspension, such as for example as a milk of lime suspension. In one embodiment, the slurry or suspension of the calcium carbonate derived binder may include one or more of: the at least one rheological agents and/or anti flocculants. The combination of the calcium carbonate derived binder with the rheological agent(s) and anti flocculant(s) provides a reactive priming agent which is capable during manufacture of providing a very thin layer of calcium carbonate with a high surface area and good contact with the substrate.

Calcium carbonate derived binder is preferably present within the building product in an amount of at least 10% by weight, preferably at least 20% by weight, more preferably at least 30% by weight, for example about 35% by weight of the total weight of the mixture. Calcium carbonate derived binder is preferably present within the building product in an amount of no more than 90% by weight, preferably no more than 80% by weight, more preferably no more than 70% by weight, more preferably no more than 60% by weight, for example no more than about 55% by weight of the total weight of the mixture. In one embodiment, calcium carbonate derived binder is present within the building product in an amount of between 10% and 90% by weight, preferably between 20% and 80% by weight, preferably between 30% and 70% by weight, for example between 35% and 55% by weight of the total weight of the mixture.

Calcium carbonate derived binder may be present in the form of lime or hydrated lime (or hydrated calcium carbonate) or modified lime. The method may further comprise processing raw calcium carbonate to produce hydrated calcium carbonate as the calcium carbonate derived binder.

In one embodiment, the calcium carbonate derived binder is provided in a powdered form. The powdered form of the calcium carbonate derived binder may be introduced to water to form a calcium carbonate derived binder slurry. The calcium carbonate derived binder slurry may be mixed with a lignocellulosic bio-aggregate and then set in a range of different shapes. The calcium carbonate derived binder slurry may be used in any suitable method of manufacturing the building product, such as for example in casting, deposition or extrusion, to produce a building product having a pre-determined shape and/or dimensions. The method of the present invention enables a range of differently shaped products to be formed from the mixture a lignocellulosic bio-aggregate and calcium carbonate derived binder.

The bio-aggregate is preferably present within the building product in an amount of at least 5% by weight, preferably at least 10% by weight, preferably at least 15% by weight of the total weight of the mixture. The bio-aggregate is preferably present within the building product in an amount of no more than 60% by weight, preferably no more than 50% by weight, preferably no more than 40% by weight, more preferably no more than 30% by weight of the total weight of the mixture. In one embodiment, the bio-aggregate is present within the building product in an amount with the range of between 5% and 60% by weight, preferably between 10% and 50% by weight, preferably between 15% and 40% by weight, more preferably between 15% and 30% by weight of the total weight of the mixture.

The ratio of calcium carbonate derived binder to bio-aggregate by weight is preferably at least 1:1, preferably at least 1.5:1, preferably at least 1.75:1, preferably at least 2:1, more preferably at least 2.2:1. The ratio of calcium carbonate derived binder to bio-aggregate by weight is preferably no more than 6:1, preferably no more than 5.5:1, preferably no more than 5:1. The ratio of calcium carbonate derived binder to bio-aggregate by weight is preferably in the range of between 1:1 and 6:1, preferably in the range of between 1.5:1 and 5.5:1, preferably in the range of between 1.75:1 and 5:1, preferably in the range of between 2:1 and 5:1.

The density of the building product, after drying, may be in the range of between 350 and 850 kg/m$^3$, preferably in the range of between 400 kg/m$^3$ and 800 kg/m$^3$, preferably in the range of between 350 kg/m$^3$ and 750 kg/m$^3$.

The building product may further comprise at least one rheological agent. In one embodiment, the at least one rheological agent comprises at least one sag reducing rheological agent. The at least one sag reducing rheological agent is preferably selected from one or more of: nano cellulose fibers, micro fibrillated cellulose, hydroxyethyl cellulose, methyl cellulose or any combination thereof. Preferably the at least one sag reducing rheological agent is methyl cellulose.

The inclusion of at least one sag reducing rheological agent helps to achieve predetermined flow characteristics of the bio-aggregate and calcium carbonate derived binder during mixing and deposition, such as for example for continuous extrusion. The presence of the at least one sag reducing rheological agent within the mixture of the calcium carbonate derived binder and bio-aggregate can help to achieve predetermined flow characteristics such that the mixture can be applied or formed into complex geometries and provides the basis of a mixture that can be cast with no requirement for a formwork, specifically 3D printing of buildings in their entirety, elements or components. In one embodiment, the mixture may be extruded into temporary formwork. The mixture may set quicker and as a result the temporary formwork may be removed sooner. In one embodiment, the mixture may be extruded between lining paper or onto or in between other laminates. The mixture may set quicker and as a result may be moved sooner.

In one embodiment, the at least one rheological agent comprises at least one flow increasing rheological agent. The at least one flow increasing rheological agent may be selected from one or more of: calcium ligno sulfinate, sodium ligno sulfinate, ammonia ligno sulfinate, sulfonated naphthalene formaldehyde condensate, sulfonated melamine formaldehyde condensate, acetone formaldehyde condensate, polycarboxylate ethers, or any combination thereof.

It has been found that the mechanical properties of the building product may be improved by including at least one sag reducing rheological agent with at least one flow increasing rheological agent. By including both a sag reducing rheological agent with at least one flow increasing rheological agent within the mixture, it has been found that the amount of water required can be reduced to a minimum and as such the final compressive strength of the product is increased.

The building product preferably comprises at least 0.1% by weight, preferably at least 0.2% by weight, preferably at least 0.3% by weight, for example about 0.5% by weight of the total weight of the mixture of at least one rheological agent, preferably at least one sag reducing rheological agent.

The building product preferably comprises no more than 5% by weight, preferably no more than 4% by weight, for example no more than 2.5% by weight of the total weight of the mixture of at least one rheological agent, preferably at least one sag reducing rheological agent.

The building product preferably comprises between 0.1% and 5% by weight, preferably between 0.2% and 4% by weight, preferably between 0.3% and 3% by weight, for example between 0.5% and 2.5% by weight of at least one rheological agent of the total weight of the mixture, preferably at least one sag reducing rheological agent.

The building product preferably comprises at least 0.5% by weight, preferably at least 1% by weight, preferably at least 2% by weight, for example about 2.5% by weight of at least one flow increasing rheological agent of the total weight of the mixture.

The building product preferably comprises no more than 20% by weight, preferably no more than 15% by weight, for example no more than 12.5% by weight of at least one flow increasing rheological agent of the total weight of the mixture.

The building product preferably comprises between 0.5% and 20% by weight, preferably between 1% and 15% by weight, preferably between 2% and 15% by weight, for example between 2.5% and 12.5% by weight of at least one flow increasing rheological agent of the total weight of the mixture.

The ratio of flow increasing rheological agent to sag reducing rheological agent to within the mixture forming the product of the present invention is preferably at least 1:1, preferably at least 2:1, preferably at least 3:1, for example about 5:1.

The ratio of flow increasing rheological agent to sag reducing rheological agent to within the mixture forming the product of the present invention is preferably no more than 10:1, preferably no more than 9:1, preferably no more than 8:1, for example no more than 7:1.

The ratio of flow increasing rheological agent to sag reducing rheological agent to within the mixture forming the product of the present invention is preferably within the range of between 1:1 and 10:1, preferably within the range of between 2:1 and 9:1, preferably within the range of between 3:1 and 8:1, for example within the range of from 4:1 to 7:1.

The building product may further comprise at least one water retention agent. The at least one water retention agent is preferably selected from galactomannan polysaccharides comprising one or more of: fenugreek gum; guar gum; tara gum; locust bean gum; *cassia* gum or any combination thereof. The at least one water retention agent is preferably selected from non-galactomannan polysaccharides comprising one or more of: brown algae inclusive of alginic acid; sodium alginate; potassium alginate; ammonium alginate; calcium alginate, or any combination thereof. In one embodiment, the at least one water retention agent is preferably selected from one or more of agar; pectin; gelatin, or any combination thereof.

The at least one water retention agent may be present to improve the cure, for example by shortening the curing time and/or to improve the mechanical properties, of the calcium carbonate derived binder, thus improving the rate of improvement of mechanical properties of the bio-aggregate/calcium carbonate mixture. The transfer of $CO_2$ from the atmosphere into the calcium hydroxide binder is required in order to set the binder. This transfer occurs when carbonic acid is produced through water and $CO_2$ being present. The composite requires the correct diffusion of water vapor during drying to make this happen at an optimised rate within the mixture to ensure that production of the building products is cost effective. The correct blend and ratio of water retention agent(s) within the mixture also allow for homogenous and even distribution of water when mechanically processed, such as for example during extrusion. This secondary function helps to improve the material cohesion of the mixture significantly, improving the architecture as well as the chemical nature of the final building product.

The at least one water retention agent is preferably present within the building product in an amount of at least 0.1% by weight, preferably at least 0.2% by weight, preferably at least 0.3% by weight, for example about 0.5% by weight of the total weight of the mixture.

The building product preferably comprises no more than 5% by weight, preferably no more than 4% by weight, for example no more than 2.5% by weight of at least one water retention agent of the total weight of the mixture.

The building product preferably comprises between 0.1% and 5% by weight, preferably between 0.2% and 4% by weight, preferably between 0.3% and 3% by weight, for example between 0.5% and 2.5% by weight of at least one water retention agent of the total weight of the mixture.

The building product may further comprise at least one fiber reinforcement to provide additional mechanical strength. The at least one fiber reinforcement may comprise any suitable fibers configured to provide additional mechanical strength to the building product. The at least one fiber reinforcement may for example comprise one or more of: natural short fiber reinforcement(s), metallic fiber(s), micro-metallic fiber(s), synthetic fiber(s), mineral fiber(s), or any combination thereof. The fiber reinforcement preferably comprises one or more of: cellulose fibers (preferably recycled cellulose fibers), viscose fibers (preferably recycled viscose fibers), hemp fibers, flax fibers, polypropylene, glass fibers (preferably recycled glass fibers), or any combination thereof. The metallic or micro-metallic fiber may be composed of steel.

The at least one fiber reinforcement is preferably present within the building product in an amount of at least 0.1% by weight, preferably at least 0.2% by weight, preferably at least 0.3% by weight, for example about 0.5% by weight of the total weight of the mixture.

The building product preferably comprises no more than 5% by weight, preferably no more than 4% by weight, for example no more than 2.5% by weight of at least one fiber reinforcement of the total weight of the mixture.

The building product preferably comprises between 0.1% and 5% by weight, preferably between 0.2% and 4% by weight, preferably between 0.3% and 3% by weight, for example between 0.5% and 2.5% by weight of at least one fiber reinforcement of the total weight of the mixture.

The building product may further comprise a cementitious binder, comprising one or more of: natural cement, ordinary Portland cement, or any combination thereof. The cementitious binder may further comprise one or more pozzolanic inclusions to increase mechanical properties of the building product in the short and/or long term. In one embodiment, ordinary Portland cement is used to substitute for natural cement within the cementitious binder. In one embodiment, ordinary Portland cement is present as a substitute for natural cement, in which ordinary Portland cement is present in an amount of approximately 50% by volume of natural cement, the remainder of volume of natural cement is substituted with calcium hydrate.

The one or more pozzolanic inclusions may be selected from one or more of: Pulverised Fly Ash (PFA), Ground Granulated Blast furnace Slag (GGBS), Metakaolin, Silica Fume Ash, or any combination thereof.

The cementitious binder may be present in an amount of at least 5% by weight, preferably at least 10% by weight, preferably at least 15% by weight, for example at least 20% by weight of the total weight of the mixture.

The cementitious binder may be present in an amount of no more than 60% by weight, preferably no more than 50% by weight, preferably no more than 45% by weight of the total weight of the mixture.

The cementitious binder may be present in an amount in the range of between 5% and 60% by weight, preferably in the range of between 10% and 50% by weight, preferably between 15% and 45% by weight, preferably between 20% and 45% by weight, of the total weight of the mixture.

In one embodiment, the cementitious binder comprises natural cement and ordinary Portland cement. Preferably, the ratio of natural cement to ordinary Portland cement within the cementitious binder is between 0.1:1 to 10:1, preferably between 0.2:1 to 5:1, preferably between 0.3:1 to 3:1, preferably between 0.5:1 to 2:1, for example about 2:1.

The ratio of bio-aggregate to cementitious binder by weight is preferably at least 1:1, preferably at least 1.5:1, preferably at least 1.6:1. The ratio of bio-aggregate to cementitious binder by weight is preferably no more than 3.5:1, preferably no more than 3:1, preferably no more than 2.75:1, preferably no more than 2.5:1. The ratio of bio-aggregate to cementitious binder is preferably in the range of between 1:1 and 3.5:1, preferably in the range of between 1.5:1 and 3:1. preferably in the range of between 1.6:1 and 2.75:1, preferably in the range of between 1.6:1 and 2.5:1.

The mixture for forming the product of the present invention may further comprise sand, preferably fine sand.

The sand may be present in an amount of at least 1% by weight, preferably at least 2% by weight, preferably at least 3% by weight, for example at least 5% by weight of the total weight of the mixture.

The sand may be present in an amount of no more than 30% by weight, preferably no more than 20% by weight, preferably no more than 15% by weight of the total weight of the mixture.

The sand may be present in an amount in the range of between 1% and 30% by weight, preferably in the range of between 2% and 20% by weight, preferably between 5% and 15% by weight of the total weight of the mixture.

The sand is a fine, sharp sand. Preferably, the particles within the sand have a maximum particles size of within the range between 0.5 mm and 2.5 mm.

The mixture may further comprise at least one secondary coupling agent. The secondary coupling agent helps to improve the interface between the bio-aggregate and the calcium carbonate derived binder. The secondary coupling agent enables an improved physical and chemical interface to be provided between the bio-aggregate and the calcium carbonate derived binder. The presence of the secondary coupling agent helps to prevent or to minimise the risk of the bio-aggregate shrinking during the curing stage of the mixture. The secondary coupling agent may help to fill gaps provided between the binder and the bio-aggregate. Suitable secondary coupling agents include one or more of: methylated cellulose, fenugreek gum, guar gum, tamarind gum, or any combination thereof.

The building product may be one or more of: dry-lining, insulation, structural insulation panels (SIPS), underfloor heating cassettes, ceiling tiles, wall tiles, external cladding panels, block, bricks, tiles, lintels, modular building components, prefabricated building elements for modular buildings (including but not limited to one or more of: walls, ceilings, floors, and/or integral heated substructure), or any combination thereof.

The building product is a water and/or water vapor and/or air permeable building product.

The building product may be formed from mixing calcium carbonate derived binder and bio-aggregate by continuous extrusion using for example offsite construction techniques. The particle size of the granulates within the bio-aggregate, and optionally the presence of rheological agent(s) and secondary coupling agent(s), enable the mixture to have suitable flow characteristics for continuous extrusion.

In one embodiment, the product may be formed by one or more of: 3D printing, and/or prefabrication through continuous extrusion, and/or through co-manufacturing.

In one embodiment, one or more of the water retention agent, rheological agent, secondary coupling agent, anti-flocculating agent may be present within a suspension or slurry with the calcium carbonate derived binder.

According to a further aspect, the present invention provides a building structure comprising a plurality of building products described herein. The building products may each be manufactured separately or co-manufactured (through deposition, extrusion (for example continuous extrusion) and/or 3D printing), and assembled together to provide the building structure.

The method preferably comprises mixing bio-aggregate and calcium carbonate together as a dry mixture, subsequently mixing the dry mixture together with water to form a paste or slurry. In one embodiment, the bio-aggregate and calcium carbonate are mixed together as a wet mixture to form a paste or slurry.

Water may be heated to any suitable temperature, such as for example up to 90° C., before mixing.

The method preferably further comprises continuous extrusion or deposition of the paste. In one embodiment, the method further comprises 3D printing with the paste to form the building product.

The method preferably further comprises curing the mixture of bio-aggregate and calcium carbonate derived binder to form the building product. The mixture may be cured by exposing the mixture to heat from a heat source. Heat may be applied to the newly formed product during and/or shortly after formation of the product, for example during and/or shortly after shaping of the mixture into the predetermined shape of the building product. In one embodiment, the mixture may be formed into a predetermined shape, for example by deposition or extrusion. The heat may be sufficient to decrease the initial set time. Heat may be applied via direct contact, through conduction, or indirectly through convection or infrared heat. Once the product has been formed, the product may then be stacked in racking and taken to a drying chamber. The temperature of the drying chamber is preferably at least 20° C. The temperature of the drying chamber is preferably no more than 40° C. The relative humidity (RH) of the drying chamber is preferably at least 10%, preferably at least 20%, for example at least 30%. The relative humidity (RH) of the drying chamber is preferably no more than 90%, preferably no more than 80%, preferably no more than 70%. The relative humidity of the drying chamber is preferably in the range of between 10% and 90%, preferably in the range of between 20% and 80%, preferably in the range of between 30% and 70%. The product may be dried for any suitable time period, for example for at least 1 day, preferably at least 3 days, for example for a period of between 3 and 5 days.

Embodiments of the present invention will now be described by way of example only.

DETAILED DESCRIPTION

Example 1—Composition of Dry Mixture for Forming Bio-Aggregate Based Building Product The dry mixture for forming the building product comprises:

| | |
|---|---|
| Lignocellulosic bio-aggregate | 15-30% wt. |
| Calcium carbonate derived binder (lime) | 35-55% wt. |
| Cementitious binder | 20-45% wt. |
| Sand | 5-15% wt. |
| Rheological agents | 0.5-2.5% wt. |
| Water Retention Agent | 0.5-2.5% wt. |
| Fiber Reinforcement | 0.5-2.5% wt. |

The percentages are based on the weight percent of each component based on the total weight of the dry mixture.

Rheological agents include a sag reducing agent and a flow increasing agent.

Example 2—Paste for Forming Bio-Aggregate Based Building Product

Water is added to the dry mixture of Example 1 to form a paste. Water is added to the dry mixture in an amount of 40-60% wt. based on the total weight of the wet mixture/paste.

A flow increasing agent may also be added in an amount of between 2.5% and 12.5% by weight based on the total amount of water added to the dry mixture.

Example 3—Particle Size Distribution of Lignocellulosic Bio-Aggregate

Figure 1:
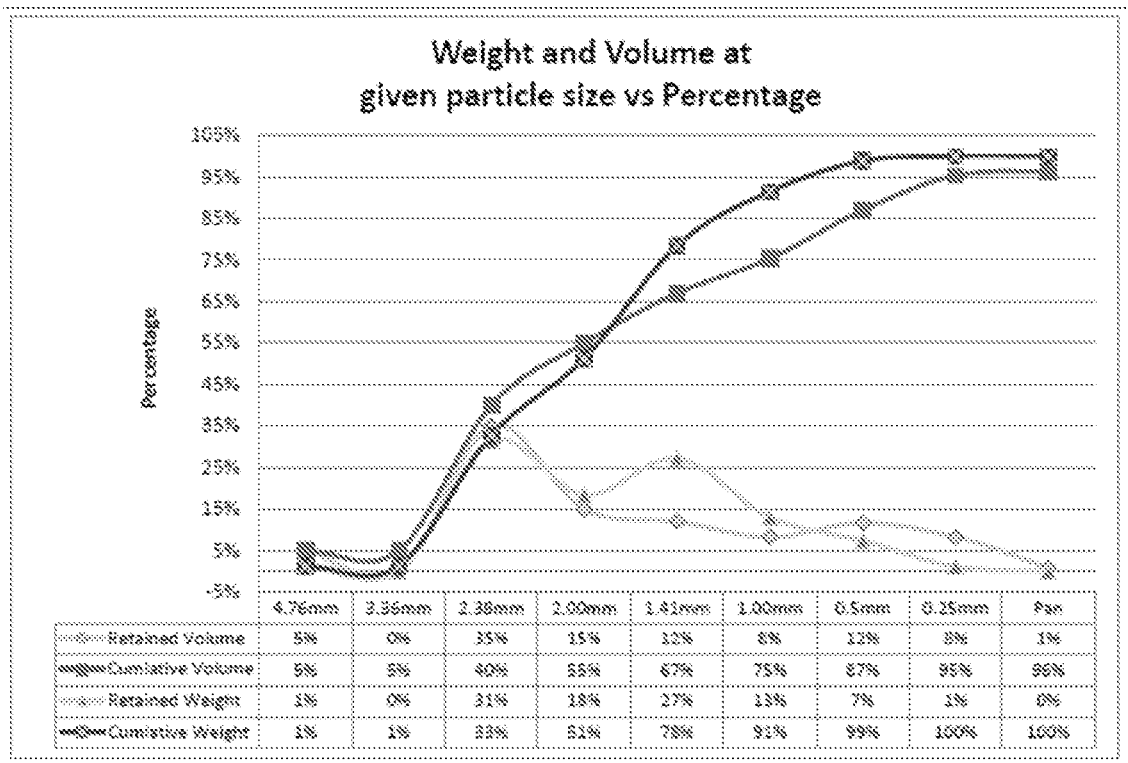
FIG. 1 is a graph illustrating the particle size distribution of bio-aggregate particles within the lignocellulosic bio-aggregate forming the product of the present invention.

FIG. 1 illustrates the particle size distribution of the lignocellulosic bio-aggregate of the building product for forming a board having a thickness of 15 mm according to one embodiment of the present invention.

It can be seen that (by weight), 100% of the bio-aggregate granulates have a maximum particle size within the range of 0.25 mm to 4.76 mm. Furthermore, 99% of the bio-aggregate granulates have a maximum particle size within the range of 0.25 mm to 2.38 mm. Furthermore, 98% of the bio-aggregate granulates have a maximum particle size within the range of 0.5 mm to 2.38 mm. Furthermore, 89% of the bio-aggregate granulates have a maximum particle size within the range of 1 mm to 3.36 mm. Furthermore, 76% of the bio-aggregate granulates have a maximum particle size within the range of 1.41 mm to 2.38 mm. Furthermore, 48% of the bio-aggregate granulates have a maximum particle size within the range of 2.00 mm to 2.38 mm. The 50th percentile, based on weight, of the maximum particle size of the bio-aggregate granulates can be found at about 2.00 mm.

The maximum particle size of the bio-aggregate granulates is selected depending on the dimensions, such as thickness, of the resultant building product. In this exemplified embodiment, the maximum value of the maximum particle size of the bio-aggregate granulates is no more than a factor of 0.3 times the thickness of the resultant board. This is of particular importance for thinner building products. It is however to be understood that thicker building products may include additional structural enforcements to provide the structural rigidity of the product, and as such the maximum particle size of the bio-aggregate granulates is of less importance.

The particle size distribution is important to ensure that the mixture can be used for large scale production, such as for example in continuous extrusion. The particle size distribution of the bio-aggregate as shown in FIG. 1 ensures that a mixture can be produced which has suitable viscosity, rheology and cohesion for use in industrial processing.

Example 4—Acoustic Absorption Coefficient of the Bio-Aggregate Based Building Product Three embodiments of the bio-aggregate based building product were prepared (BB-F-001, BB-F-002 and BB-F-003) and the acoustic absorption coefficients of each of these products were measured in comparison to a gypsum based building product (Gypsum).

Figure 2:
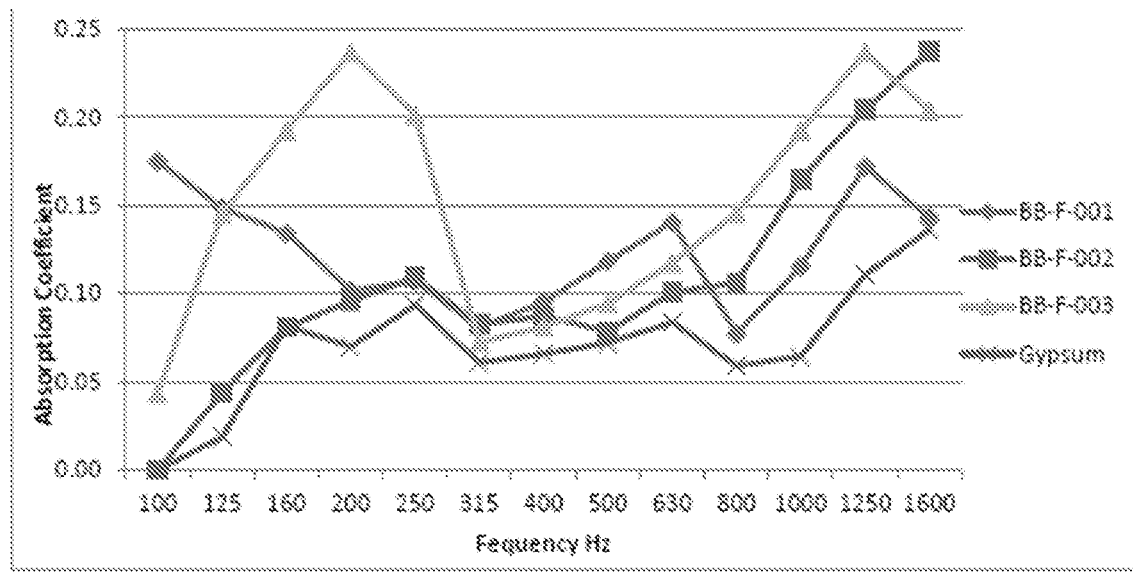
FIG. 2 is a graph illustrating the acoustic absorption coefficient of three bio-aggregate based building products according to embodiments of the present invention compared to gypsum based building products.

It can be seen from FIG. 2 that the absorption coefficients of the bio-aggregate based building products of the present invention (BB-F-001, BB-F-002 and BB-F-003) are significantly higher, especially at low and high frequencies, than the absorption coefficient of the gypsum product. The increased absorption efficiencies are a result of the pores within the macroporous element storing air, and the changes in density within the product, which as a result increase the impedance of sound. The products of the present invention therefore provide an environmentally friendly, low density product with improved acoustic performance compared to gypsum based equivalents.

The invention claimed is:

1. A bio-aggregate based building product comprising a macroporous element formed from a mixture of: a calcium carbonate derived binder and a lignocellulosic bio-aggregate, in which the macroporous element has an air and/or vapor and/or water open matrix with a microcapillary structure formed by the lignocellulosic bio-aggregate,
   in which the porosity of the macroporous element is at least 50% of the bulk volume of the building product; and
   in which between 40% and 80% by weight of bio-aggregate granulates forming the lignocellulosic bio-aggregate have a maximum particle size falling within the lower 50% of the particle size range; and
   in which no more than 5% by weight of bio-aggregate granulates forming the lignocellulosic bio-aggregate have a maximum particle size falling within the upper 20% of the particle size range; and
   wherein the bio-aggregate based building product further comprises at least one water retention agent.

2. A bio-aggregate based building product as claimed in claim 1, in which the bio-aggregate is a milled lignocellulosic bio-aggregate.

3. A bio-aggregate based building product as claimed in claim 1, in which the bio-aggregate is formed from chemically unprocessed lignocellulosic plant material.

4. A bio-aggregate based building product as claimed in claim 1, in which no more than 10% by weight of bio-aggregate granulates forming the bio-aggregate have a maximum particle size falling within the lower 20% of the particle size range.

5. A bio-aggregate based building product as claimed in claim 1, in which no more than 5% by weight of bio-aggregate granulates forming the bio-aggregate have a maximum particle size falling within the upper 40% of the particle size range.

6. A bio-aggregate based building product as claimed in claim 1, in which no more than 40% by weight of bio-aggregate granulates forming the bio-aggregate have a maximum particle size falling within the upper 50% of the particle size range.

7. A bio-aggregate based building product as claimed in claim 1, in which at least 60% by weight of bio-aggregate granulates forming the bio-aggregate have a maximum particle size falling within the lower 50% of the particle size range.

8. A bio-aggregate based building product as claimed in claim 1, in which the lignocellulosic bio-aggregate is formed from one or more of: Common wheat, Hemp, Oats, Rapeseed, Barley straw, Giant *miscanthus*, Bamboo, Flax, Rice straw, Corn straw, Sugarcane bagasse, Sisal straw, or any combination thereof.

9. A bio-aggregate based building product as claimed in claim 1, in which calcium carbonate derived binder is present within the bio-aggregate based building product in an amount of at least 10% by weight based on the total weight of the mixture.

10. A bio-aggregate based building product as claimed in claim 1, in which the lignocellulosic bio-aggregate is present within the bio-aggregate based building product in an amount of at least 10% by weight based on the total weight of the mixture.

11. A bio-aggregate based building product as claimed in claim 10, in which the bio-aggregate is present within the bio-aggregate based building product in an amount with the range of between 15-30% by weight based on the total weight of the mixture.

12. A bio-aggregate based building product as claimed in claim 1, further comprising at least one rheological agent.

13. A bio-aggregate based building product as claimed in claim 12, in which the at least one rheological agent comprises one or more of: at least one sag reducing rheological agent and/or at least one flow increasing rheological agent.

14. A bio-aggregate based building product as claimed in claim 1, in which the at least one water retention agent is selected from one or more of:
  (i) galactomannan polysaccharides comprising one or more of: fenugreek gum, guar gum, tara gum, locust bean gum, *cassia* gum, or any combination thereof; and/or
  (ii) non-galactomannan polysaccharides comprising one or more of: alginic acid, sodium alginate, potassium alginate, ammonium alginate, calcium alginate, or any combination thereof; and/or
  (iii) agar, pectin, gelatin, or any combination thereof.

15. A bio-aggregate based building product as claimed in claim 1, further comprising fiber reinforcement.

16. A bio-aggregate based building product as claimed in claim 15, in which the fiber reinforcement is selected from one or more of: natural short fiber reinforcement, metallic fiber, and/or micro-metallic fiber, or any combination thereof.

17. A bio-aggregate based building product as claimed in claim 1, further comprising at least one cementitious binder.

18. A bio-aggregate based building product as claimed in claim 1, in which the bio-aggregate based building product is one or more of: dry-lining, insulation, structural insulation panels (SIPS), underfloor heating cassettes, ceiling tiles, wall tiles, external cladding panels, block, bricks, tiles, lintels, modular building components, prefabricated building elements, or any combination thereof.

19. A method of forming a building product comprising a macroporous element having an air and/or vapor and/or water open matrix with a microcapillary structure, comprising mixing lignocellulosic bio-aggregate with calcium carbonate derived binder, in which between 40% and 80% by weight of bio-aggregate granulates forming the lignocellulosic bio-aggregate have a maximum particle size falling within the lower 50% of the particle size range; and in which no more than 5% by weight of bio-aggregate granulates forming the lignocellulosic bio-aggregate have a maximum particle size falling within the upper 20% of the particle size range, and
  wherein the lignocellulosic bio-aggregate and calcium carbonate derived binder are mixed together as a dry mixture and the dry mixture is subsequently mixed together with water to form a paste.

20. A method as claimed in claim 19, further comprising continuous extrusion or deposition of the paste to form the building product.

21. A bio-aggregate based building product comprising a macroporous element formed from a mixture of: a calcium carbonate derived binder and a lignocellulosic bio-aggregate, in which the macroporous element has an air and/or vapor and/or water open matrix with a microcapillary structure formed by the lignocellulosic bio-aggregate,
  in which the porosity of the macroporous element is at least 50% of the bulk volume of the building product; and
  in which between 40% and 80% by weight of bio-aggregate granulates forming the lignocellulosic bio-aggregate have a maximum particle size falling within the lower 50% of the particle size range; and
  in which no more than 5% by weight of bio-aggregate granulates forming the lignocellulosic bio-aggregate have a maximum particle size falling within the upper 20% of the particle size range; and
  wherein the bio-aggregate based building product further comprises at least one rheological agent.

22. A bio-aggregate based building product as claimed in claim 21, in which the at least one rheological agent comprises one or more of: at least one sag reducing rheological agent and/or at least one flow increasing rheological agent.

23. A bio-aggregate based building product comprising a macroporous element formed from a mixture of: a calcium carbonate derived binder and a lignocellulosic bio-aggregate, in which the macroporous element has an air and/or vapor and/or water open matrix with a microcapillary structure formed by the lignocellulosic bio-aggregate,
  in which the porosity of the macroporous element is at least 50% of the bulk volume of the bio-aggregate based building product; and
  in which between 40% and 80% by weight of bio-aggregate granulates forming the lignocellulosic bio-aggregate have a maximum particle size falling within the lower 50% of the particle size range; and
  in which no more than 5% by weight of bio-aggregate granulates forming the lignocellulosic bio-aggregate have a maximum particle size falling within the upper 20% of the particle size range; and
  wherein the bio-aggregate based building product further comprises fiber reinforcement.

24. A bio-aggregate based building product as claimed in claim 23, in which the fiber reinforcement is selected from one or more of: natural short fiber reinforcement, metallic fiber, and/or micro-metallic fiber, or any combination thereof.

\* \* \* \* \*